(12) United States Patent
Loushin et al.

(10) Patent No.: US 7,535,501 B1
(45) Date of Patent: May 19, 2009

(54) TESTING OF DIGITAL CAMERAS

(75) Inventors: Robert S. Loushin, Eagan, MN (US);
Ronald L. Antos, Plymouth, MN (US);
John R. Reinert-Nash, Prior Lake, MN (US)

(73) Assignee: Lifetouch, Inc., Eden Prairie, MN (US)

( * ) Notice: Subject to any disclaimer, the term of this patent is extended or adjusted under 35 U.S.C. 154(b) by 745 days.

(21) Appl. No.: 10/963,124

(22) Filed: Oct. 12, 2004

(51) Int. Cl.
*H04N 9/64* (2006.01)

(52) U.S. Cl. ............... 348/246; 382/275; 358/3.26

(58) Field of Classification Search ............ None
See application file for complete search history.

(56) References Cited

U.S. PATENT DOCUMENTS

| | | | |
|---|---|---|---|
| 4,893,185 A | 1/1990 | Fukushima et al. | |
| 5,436,979 A * | 7/1995 | Gray et al. | 382/141 |
| 5,589,882 A | 12/1996 | Shiraishi et al. | |
| 5,798,847 A * | 8/1998 | Aerts | 358/464 |
| 5,805,216 A | 9/1998 | Tabei et al. | |
| 6,035,072 A * | 3/2000 | Read | 382/275 |
| 6,233,364 B1 * | 5/2001 | Krainiouk et al. | 382/275 |
| 6,304,986 B1 | 10/2001 | Ma et al. | |
| 6,396,539 B1 | 5/2002 | Heller et al. | |
| 6,683,643 B1 * | 1/2004 | Takayama et al. | 348/247 |
| 6,771,307 B2 | 8/2004 | Waki et al. | |
| 6,791,608 B1 * | 9/2004 | Miyazawa | 348/246 |
| 2002/0093577 A1 * | 7/2002 | Kitawaki et al. | 348/241 |
| 2003/0039402 A1 * | 2/2003 | Robins et al. | 382/275 |
| 2004/0027618 A1 * | 2/2004 | Nakamura et al. | 358/3.26 |
| 2004/0189812 A1 * | 9/2004 | Gustavsson et al. | 348/207.99 |
| 2004/0208395 A1 * | 10/2004 | Nomura | 382/275 |
| 2005/0068445 A1 * | 3/2005 | Steinberg et al. | 348/335 |

OTHER PUBLICATIONS

"Diigital Image Processing," Gregory Baxes, 1994, john Wiley and Sons, ISBN 0-471-00949-0.*

* cited by examiner

*Primary Examiner*—Tuan V Ho
*Assistant Examiner*—Dennis Hogue
(74) *Attorney, Agent, or Firm*—Nikolai & Mersereau, P.A.; C. G. Mersereau

(57) ABSTRACT

A method of automatically checking digital camera images for dust on the image sensors of the associated cameras is disclosed that enables operators to check the performance level of digital cameras in real time and correct or take out of service those that do not pass the checking procedure.

48 Claims, 1 Drawing Sheet

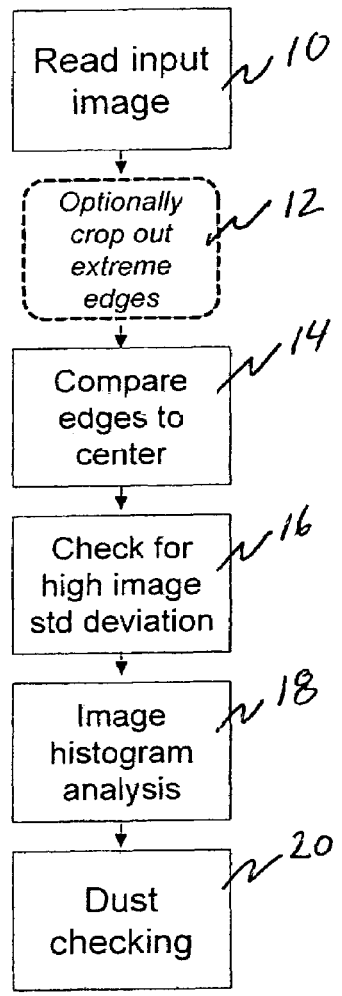
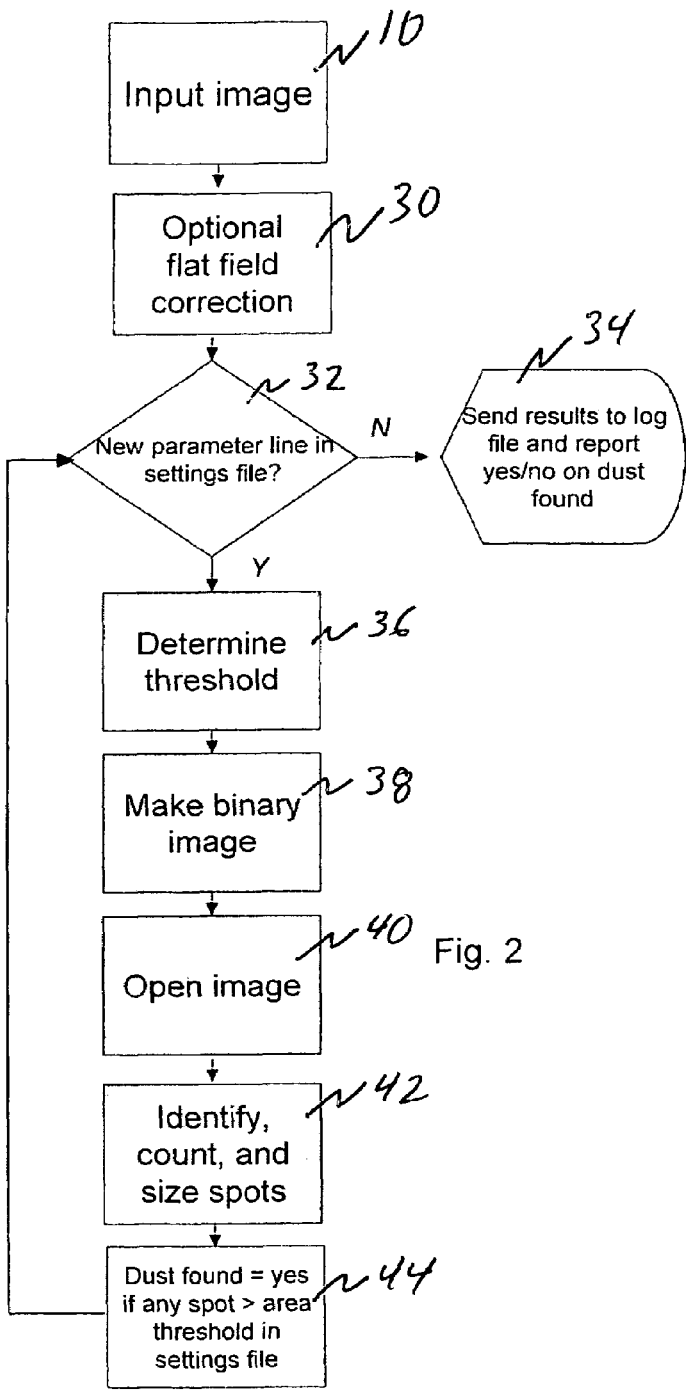
Fig. 1
Fig. 2

TESTING OF DIGITAL CAMERAS

BACKGROUND OF THE INVENTION

I. Field of the Invention

The present invention relates generally to digital photography and, more particularly, to the use of digital cameras and a method for detecting the presence of foreign objects such as dust, dirt or other debris on the imaging sensor of digital cameras which affect print quality.

II. Related Art

It has been found that the quality of prints produced from image data files created by digital cameras is adversely affected by the presence of dust on the imaging sensor arrays of the cameras. This is because such imaging sensors can serve as small particle attractants. In fact, a large proportion of defects requiring retouching or retakes in photographic studios which use digital cameras is caused by dust spots. The dust producing the spots is typically found on the imaging sensor of the studio camera and the existence of the problem generally is not visible to studio associates previewing orders on a computer screen prior to printing the pictures because of the lower resolution of the images displayed on a computer screen. As a result, the studio can take several days worth of customer images before a dust problem is revealed in associated output prints at the production plant. This may further result in a rather large number of printing orders having to be retaken once the problem is identified and corrected. Therefore, it would be very desirable if a method of checking for dust at the studio could be implemented on a regular basis, for example daily, particularly prior to the use of a given camera.

Examples of systems for identifying and tagging anomalies such as scratches or dust in a digital image are Shown in U.S. Pat. Nos. 6,233,364 B1 and 5,436,979. A system for a camera with a detachable lens is shown in U.S. Pat. No. 6,791,608 B1.

SUMMARY OF THE INVENTION

By means of the present invention, there is provided a method of automatically checking for sensor dust and dirt that enables photographers to check the performance level of digital cameras and correct images with dust artifacts or take out of service those cameras that do not pass the checking procedure. The method involves applying a software routine that includes applying a variety of image processing techniques to a digital image in a series of steps performed by the software. The routine automatically analyzes the image and checks it for imperfections associated with the presence of dust artifacts on a camera sensor array. The task of detecting sensor dust according to the invention is preferably implemented in two main phases. The first phase includes a routine which verifies that the input or test image is a proper candidate for the second or dust checking phase. The second phase involves a comprehensive pixel processing routine to evaluate evidence of the presence of dust artifacts on the associated camera sensor. While the implementation of both phases is preferred, it will be appreciated that an image may be processed using only the second phase, if desired.

In the first phase of a preferred method, a digital camera to be tested is used to capture a full-frame input or test image of a selected gray target or other uniform pixel value test card of known lightness value that is photographed purposely out of focus. A preferred embodiment of the test target is a light gray card, but other targets, including tinted ones, are also usable. The image is next transferred to a computer. Software on the computer extensively checks the test image to ensure that the test image is a proper image for use in testing the associated camera sensor for the presence of dust artifacts before the dust analysis steps are performed.

To test the image for correctness, the image is first read and loaded into memory. If desired, the extreme edges of the image may be cropped to make sure that the desired image fills the frame field. A similar or companion step compares strips of pixels along all four edges of the image with those of a region in the middle using a pre-determined pixel variation threshold to identify any dark bands that exist at the edges of the image which also indicate non-full-frame test image captures. A standard deviation check then is applied to verify that the image is in fact that of the desired gray card. Standard deviations above a predetermined threshold indicate pictorial content other than the desired gray card in the image and such images are rejected. A final suitability check or verification test for the image involves a simple histogram analysis of the image which also identifies the target card. A histogram of a proper uniform pixel value test image should consist of a single narrow peak, the existence of which the histogram analysis will confirm.

Images that pass the extensive verification checking of phase one are then subjected to the second phase of the analysis which involves a process to check the images for blemishes indicating the presence of dust artifacts on the sensor producing the image. This phase uses a program that involves image thresholding followed by morphological analysis. The initial phase is used to screen images so that the second phase is performed only on proper image candidates.

Optionally, the image may undergo a flat field correction before the dust check by creating and subtracting a blurred or otherwise smoothed image to remove variations in pixel value that are large spatially due to uneven lighting or the like during image capture. There exist a range of algorithms suitable for applying a flat field correction, including simple mean filtering, median filtering, Gaussian convolution, local thresholding, and morphological methods. These techniques are known to those in the art.

The image dust analysis program first accesses a settings file which is a text file that includes comment lines and parameter lines consisting of numbers and checks it for criteria number settings which govern how much darker or lighter and how large an artifact must be to be counted and numbers for a pass/fail indicator ("dust flag"). For each set of parameters in the settings file, the program then computes a dust detection threshold pixel value. The threshold pixel value is calculated as a selected percentage darker than the gray card mean pixel value. Since dust and dirt block light, image defects resulting from their presence will always appear darker than the test image. A program function then is used to transform the image into a binary representation in which above-threshold (for dust, darker) spots transform into white areas and the remainder becomes black. This binary representation may be known as a "dust map" and it is subsequently subjected to what is known in the art as a morphological opening of an image which consists of an erosion step followed by a dilation step (explained in greater detail below). This effectively eliminates minor spots or noise and generally cleans up the image in a manner such that most white spots return to their original size while very small white spots unlikely to be dust are eliminated.

This is followed by a further analysis step in which the program operates to count the white spots and measure their sizes and locations. Intensities of any found dust spots may be determined by reporting the pixel values at corresponding coordinates of the original image. If any spots are found greater than a size threshold in the settings file, a fail notation is made in a dust check log file which keeps a running record of test results along with other pertinent information. Conversely, if dust is not found, the image passes the test and this is also noted in the log file.

Because the coordinates and sizes of the dust artifacts are then known, compensation can be made in the image and an amount of correction can be inputted and saved based upon data found. This can be in the form of a corrective template to be applied to subsequent digital images obtained to compensate for the dust or other artifacts formed. Alternatively, an image can be displayed or printed with indicia of the spots where dust occurred as, for example, by applying contrasting, possibly red circles to the areas affected. Also, in a tethered system or a system in which the camera is otherwise in direct communication with a control input, a signal or "dust found" flag sent to the log file may also be used to lock out or otherwise prevent operation of the corresponding camera responsible for the failed image.

BRIEF DESCRIPTION OF THE DRAWINGS

In the drawings:

FIG. 1 is a schematic flow chart indicating the analysis steps in an initial image checking and verification sequence for the present invention; and FIG. 2 is a schematic flow chart illustrating the steps in actual dust analysis.

DETAILED DESCRIPTION

The present invention decidedly involves the pre-testing of digital imaging sensors, such as CCD (charge-coupled device), CMOS (complementary metal oxide semiconductor), JFET (junction field effect transistor), or other image sensors associated with digital SLR or other digital cameras before problems appear in final prints or other display forms. In accordance with the detailed embodiment described, it will be recognized that variations in certain of the steps may occur to those skilled in the art and that additional information may be revealed with respect to the operation of a camera in accordance with the performance of the procedures of the invention. Thus, the detailed description herein should be taken as an example and not as a limiting factor with respect to the inventive concepts. The verification and checking steps of the invention are designed to be implemented in real time with respect to studio operation and they enable photographers to check for dust at the start of a day, for example, and swap out cameras that might be a problem before taking customer images that may later need to be retouched or remade.

While other languages may be used and might occur to those skilled in the art, a program to implement the steps of the present invention has been written using the well-known MATLAB computer language. MATLAB, of course, is a rather high level interpreted language which is well suited to fast prototyping of image processing chains and MATLAB programs ("m-files") can be compiled into executable and shared libraries that can be readily installed on a computer. It is contemplated, however, that analogous image processing steps can be accomplished in lower-level languages or other high-level languages.

As previously indicated, conceptually, the process of detecting sensor dust has two main components. These will next be described. The steps of the first are shown in the flow chart of FIG. 1. Thus, in FIG. 1, there is shown a schematic flow chart of the image verification aspect of the procedure. The success of the overall endeavor, of course, depends on the selection of a correct image for analysis. In this regard, it has been found that plain gray or white defocused images prove to be the best test images and, of these, a gray card is preferred because it has been found that the test image can also be used for checking correct exposure and gray balance in addition to looking for dust artifacts, although these aspects are not part of the present invention. Any test target with a uniform pixel value and sufficient brightness would be suitable for using this method. Because uniformity is important, it is also necessary that the target image be a full-frame so that corresponding dust artifacts may be identified over the whole area of the sensor. Capturing the target frame out of focus also minimizes any structure from the gray card or other target that might erroneously be identified as sensor dust by the processing algorithms.

The program of FIG. 1, while optional, is preferred as a first phase as it has the overall task of verifying that the test image is a correct image to be tested and to eliminate those that are not suitable before further analysis steps are performed. Incorrect images could include captures of the wrong type image, i.e., those with pictorial image content or pictures of other targets such as test cards suitable only for other analytical testing rather than dust analysis and test cards that for any number of reasons have lost uniformity. Incorrectly framed captures of the proper test card, for example, with edges visible on the sides of the card, need also be rejected.

Thus, an important aspect of the success of the ensuing analysis depends on the user obtaining a good sample image. In this regard, it has been found that cards having a uniform relatively light shade are preferred. The integrity of the test card must be maintained. In capturing the image, the target should be defocused to blur out imperfections in the card. In this regard the camera may first be pointed at a target much farther away than the card target and allowed to focus on that target. Once that focus is fixed, the camera is then aimed at the dust test card and zoomed in until the card fills the frame completely and a dust check frame is then captured by the camera. Other defocusing techniques may also be used. The resulting digital image is then ready for processing.

In the first step 10 of the flow chart of FIG. 1, the input image is transferred to a computer by being read and loaded into memory using, for example, the MATLAB function imread.

In accordance with the image analysis associated with the present invention, it has also been found that successful analysis can be performed analyzing only a single color channel. Thus the analysis for dust artifacts may be performed using only the green channel. This, of course, reduces the overall amount of data that must be processed and thereby speeds up the analysis without sacrificing accuracy.

As seen in the step at 12, the first operation after the image is loaded is an optional step in which a small number of pixels is cropped from the edges of the image. This step is included as a practical fix to situations where a test image is captured that is slightly less than full frame, in reality, even though it may have appeared to be full frame in the camera view finder when the image was taken. In association with this step, there is an internal setting in units of pixels to crop from the edges which may be set to 0 pixels if it is desired to turn this function off or skip this step.

In the next step, 14, a comparison check between the edges of the image and the center is performed which amounts to a second check to determine whether a test card image has been captured that does not fill the frame. This step often catches dark bands at the edges of the image which indicate an unfilled frame. The dark band test is performed by comparing strips, possibly 250 pixels wide, on the image sides to a square consisting of a cluster of pixels in the center of the image. A variation threshold is used having a relatively generous tolerance. Normally a 25 pixel variation threshold, is applied which allows smaller lens or light falloff problem images to pass this test and later be corrected using a flat field correction, if desired. Incomplete images, where dark edge bands are indicated, are failed or rejected.

Next, each image is checked at 16 for high image standard deviation which also indicates that an erroneous (non-uniform) image is being processed. Image files with pictorial content usually have a much higher standard deviation of pixel values than a test card or other test image. Thus, in this step, the program checks to see if the standard deviation of the image pixel values is below 25. This is also a fairly generous tolerance level inasmuch as test card standard deviations are typically no more than single digits. This step is found, however, to effectively catch pictorial image files that have made it through previous checks but are not well suited for dust detection.

The final step to qualify the input image for dust checking analysis involves an image histogram analysis as at step 18 in which a simple histogram analysis of the image is produced. As previously indicated, the histogram of pixel values of a uniform pixel value test card image should consist of a single main peak. This step is used to confirm the existence of a proper histogram peak.

Images that have passed satisfactorily through the steps of phase one at 20 have been shown to be the best and most economical candidates for processing using the dust checking or dust analysis routine depicted in the flow chart of FIG. 2. The screening process of FIG. 1 yields candidates for dust checking which minimize the time required for operating the dust check part of the program. While images such as pictorial images can be used, for example, images with a great deal of image structure (pictorial scenes, for example) require much more time to be processed. It will be appreciated that an important aspect of the present invention is contained in the concept that the total image verification and dust checking routine may be accomplished quickly in real time prior to a day's photographing so that the performance of cameras to be used can be verified in a relatively short time.

The steps in the flow chart of FIG. 2 generally involve an image enhancement routine that improves identification of blemishes caused by foreign artifacts on the imaging sensor. The routine includes a thresholding sequence followed by an image morphological analysis. It begins using the input image at 10 previously read into memory.

At this juncture, a flat field correction 30, which is also an optional step, may be implemented to level the image without loss of the fine structure. In this manner, the operation attempts to remove gross variations in pixel value across the image that can result from non-uniform lighting, lens light falloff, or the like. The correction consists of applying a blur filter with a large enough kernel so that all of the dust defects in the image are blurred out and then subtracting this blurred image from the original. The pixel values are then shifted by adding the image mean pixel value to the difference image obtained. This also avoids processing problems associated with negative pixel values.

Regarding the flat field correction step, it has been found that it can be successfully performed using a simple mean filter for the blurring. This flat field method is a preferred method for dust detection; slightly improved results may be obtained with a more sophisticated median filter or other more complex flat field methods, at the expense of a significantly more complicated computation function and up to an order of magnitude longer time for analysis, which is not normally justified. Using the simple mean filter for the flat field image has been found to produce light halo artifacts around dark dust spots that do not occur when using a median filter. This phenomenon does not seem to impair dust detection inasmuch as the process seeks to identify dust spots that are darker than the card image. If, however, the flat field image is to be used to correct dust spots as well as detect them, use of the median filter is preferred as it should produce better results.

Thereafter at 32, the program accesses a settings file which may be described as a text file consisting of comment lines with descriptive text and certain parameter lines consisting of numbers which are the settings utilized to determine thresholds for the ensuing processing steps. For example, the first non-comment line may have a single number, the pixel size of the flat field window which may be set to 0, in which case, the optional flat field correction step is not used.

The remaining parameter lines in the setting file consist of three numbers. These are (a) a threshold percent number, (b) a threshold size in pixels, and (c) a "dust found" flag. The first two numbers are utilized to indicate how dark and how large a dust spot has to be in order to be significant enough to be detected. For example, a program may count dust spots that are at least 1.5 percent darker than the card and at least 20 pixels in size. The third number is a flag that determines whether to return a pass (0) or fail (1) to the user as a result of the test or to the program as indicated. Thus, for example, if the third parameter is a "1" and dust is found for the settings corresponding to the first two numbers, the program reports that it has found dust and writes the result into a log file indicated at 34 in a dust check log. If, on the other hand, the third parameter is "0", the results of the dust checking are still written in the log file, but the return code is not affected. This allows one to test different sets of parameters at the same time while only using one set for a yes/no or pass/fail decision reported back by the program.

If the program detects new parameter lines in the settings file, it proceeds to step 36, which involves a threshold calculation. For each set of parameters in the settings file, the program then computes a pixel value for a threshold to be applied to dust detection. The threshold pixel value equals the mean pixel value plus a threshold percent multiplied by the mean pixel value. Pixel values that vary from the mean pixel value by a threshold percent or more are possibly indicative of the presence of dust. It should be noted that, since dust artifacts are darker than the rest of the image, dust spots are actually indicated as darker spots which have lower pixel values than the mean.

Having obtained a map of the pixel values in step 36, a binary image can be constructed using the pixel threshold function to transform the image into a binary black/white representation where below-threshold (darker) spots are designated as white and the rest of the image is black. This, then, represents a "map." of the locations and sizes of clusters of pixels darker than the pixel value threshold. It is then necessary to clean up the image and eliminate spots below a given size as being inconsequential to the image by performing a morphological image opening process. Image opening consists of an erosion of the image followed by a dilation of the image. This is indicated at step 40 in FIG. 2.

Erosion of the image consists of taking a square structuring element, normally a 3×3 pixel square structuring element, which is used to "erode" the image by setting pixels to the minimum value of the pixels in the neighborhood defined by the square. In other words, pixels are set to 0 if any of their neighbors have a value of 0. This causes very small white (value 1) spots to disappear from the image and it causes larger white spots to shrink slightly. This having been accomplished, the same square is then used to "dilate" the resulting image by setting pixels to the maximum value of the pixels in the square neighborhood and this restores the size of the white spots after having eliminated the tiniest white spots from the image. The tiny white spots eliminated are generally inconsequential and presumed to be simply noise.

As seen at 42, the program then continues with functions to count the remaining white spots and measure their sizes and locations, thereby producing a dust map of the image. If desired, the dust spots can be marked and an image produced showing the location of all dust spots above a minimum significance. Finding dust spots which meet the minimum criteria of size and intensity initiates a dust found equals "yes" reaction at 44 which is sent to the log file at 34 and initiates a 1 as a setting file parameter which may also be known as a "dust found flag".

The appearance of a dust found flag can also be used to disable or lock out an associated camera connected to the system by a communications link such as a tether or one connected by a remote communications link. Such a system may require the connection of a camera that is checked out as being dust free prior to re-enabling use in photographing for the rest of that day.

The results of dust checking can be conveyed to the user in any of a variety of ways. A text message can be displayed on the computer indicating that dust has been found. The captured image used for dust checking can be displayed to which colored circles, e.g., red circles are added showing the location of dust on the image. Also, information gathered using the dust checking methods described above can be used as part of a dust correction protocol wherein the camera is still used, but all future images captured are corrected to eliminate the effects of dust on the CCD sensor from prints made of said future images captured by the camera.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A method for detecting the presence of sensor dust in digital cameras comprising steps of:
    (a) capturing a single test image of a selected predetermined, calibration target, said target having a generally uniform pixel intensity value throughout;
    (b) verifying that the test image is suitable for dust detecting analysis by verifying image capture and target identity and preparing the test image for an analysis performed in accordance with steps (c) and (d);
    (c) checking for dust effects by creating a binary image and performing a morphological analysis on said binary image to find and consider clusters containing collections of connected pixels to locate, identify and label areas that exceed a threshold size and are darker than a threshold intensity; and
    (d) activating an indicator that indicates that dust is present if a predetermined number of areas are identified that exceed said threshold size and are darker than said threshold intensity.

2. A method as in claim 1 wherein Step (b) includes comparing edges of said test image to a center segment of said test image to verify correct image capture, checking for high-image standard deviation of pixel values and performing an image histogram analysis to verify that the test image is of said predetermined calibration target.

3. A method as in claim 2 wherein Step (b) further comprises optionally cropping out an amount of extreme edges of said test image to ensure that said calibration target fills the entire image.

4. A method as in claim 1 comprising the further step of applying a flat field correction to said test image prior to step (c).

5. A method as in claim 1 wherein said binary image is created by establishing a threshold pixel value, said threshold pixel value being calculated as a predetermined percent darker than the mean pixel value of said test image, setting input pixels to black if lighter than said threshold pixel value and white if at or darker than said threshold pixel value.

6. A method as in claim 5 wherein said morphological analysis includes opening said image and identifying, sizing and counting spots of white pixels.

7. A method as in claim 6 wherein said step of opening said image includes successively eroding and dilating the image using a 3×3 pixel structuring element.

8. A method as in claim 1 wherein said indicator further includes indicia marks regarding location of any dust found on said image.

9. A method as in claim 8 wherein said indicia includes the drawing of circles about dust locations.

10. A method as in claim 1 including the further step of applying a correction to subsequent pictorial images from said camera to automatically compensate for any detected dust spots from the images.

11. A method as in claim 10 wherein said correction is in the form of an image template.

12. A method as in claim 1 further including the step of preventing the operation of said camera producing said test image if dust is indicated on said camera sensor.

13. A method as in claim 12 wherein operation of said camera is prevented automatically via a communication link.

14. A method as in claim 4 wherein said flat field correction includes the further steps of:
    (1) applying an averaging filter to the original image to obtain a blurred image;
    (2) subtracting the blurred image from the test image; and
    (3) adding back into each pixel the average intensity of all pixels in said test image to obtain a flat field image.

15. A method as in claim 14 wherein said averaging filter is replaced by a median filter.

16. A method for detecting the presence of sensor dust in digital cameras comprising steps of:
    (a) capturing a single test image of a selected predetermined calibration target said test image having a generally uniform pixel intensity value throughout;
    (b) verifying that the test image is suitable for dust detecting analysis by verifying image capture and target identity and preparing the test image for a dust analysis in accordance with step (c);
    (c) checking for dust effects by creating a binary image and performing a morphological analysis on said binary image to find and consider clusters containing collections of connected pixels to locate, identify and label areas that exceed a predetermined size and are darker than a predetermined intensity; and
    (d) creating a dust correction protocol to eliminate the effects of dust detected on the camera sensor from prints made of future images captured by the camera.

17. A method as in claim 16 wherein Step (b) includes comparing edges of said test image to a center segment of said test image to verify correct image capture, checking for high-image standard deviation of pixel values and performing an image histogram analysis to verify that the test image is of said predetermined calibration target.

18. A method as in claim 17 wherein Step (b) further comprises optionally cropping out an amount of extreme edges of said test image to ensure that said calibration target fills the entire image.

19. A method as in claim 16 comprising the further step of applying a flat field correction to said test image prior to step (c).

20. A method as in claim 19 wherein said flat field correction includes the further steps of:
   (1) applying an averaging filter to the original test image to obtain a blurred image;
   (2) subtracting the blurred image from the test image; and
   (3) adding back into each pixel the average intensity of all pixels in said test image to obtain a flat field image.

21. A method as in claim 20 wherein said averaging filter is replaced by a median filter.

22. A method as in claim 16 wherein
   said binary image is created by establishing a threshold pixel value, said threshold pixel value being calculated as a predetermined percent darker than the mean pixel value of said test image, setting input pixels to black if lighter than said threshold pixel value and white if at or darker than said threshold pixel value.

23. A method as in claim 22 wherein said morphological analysis includes opening said image and identifying, sizing and counting spots of white pixels.

24. A method as in claim 23 wherein said step of opening said image includes successive eroding and dilating the image using a 3×3 pixel structuring element.

25. A method as in claim 16 including the further step of applying a correction to subsequent pictorial images from said camera to automatically compensate for any detected dust spots from the images.

26. A method as in claim 25 wherein said correction is in the form of an image template.

27. A method for detecting the presence of sensor dust in digital cameras comprising steps of:
   (a) capturing a single test image of a selected predetermined calibration target having a generally uniform pixel intensity value throughout;
   (b) checking for dust effects by creating a binary image and performing a morphological analysis on said binary image to find and consider collections of connected pixels to locate and identify areas that exceed a threshold size and are darker than a threshold intensity;
   (c) optionally activating an indicator that indicates that dust is present if a predetermined number of areas are identified that exceed said threshold size and are darker than said threshold intensity; and
   (d) optionally creating a dust correction protocol to eliminate the effects of dust detected on the camera sensor from prints made of future images captured by the camera.

28. A method as in claim 27 comprising the further step of applying a flat field correction to said test image prior to step (b).

29. A method as in claim 28 wherein step (b) further comprises optionally cropping out an amount of extreme edges of said test image to ensure that said calibration target fills the entire image.

30. A method as in claim 29 comprising the further step of applying a flat field correction to said image prior to step (b).

31. A method as in claim 30 wherein said flat field correction includes the further steps of:
   (1) applying an averaging filter to the original test image to obtain a blurred image;
   (2) subtracting the blurred image from the test image; and
   (3) adding back into each pixel the average intensity of all pixels in said test image to obtain a flat field image.

32. A method as in claim 31 wherein said averaging filter is replaced by a median filter.

33. A method as in claim 27 wherein
   said binary image is created by establishing a threshold pixel value, said threshold pixel value being calculated as a predetermined percent darker than the mean pixel value of said test image, setting input pixels to black if lighter than said threshold pixel value and white if at or darker than said threshold pixel value.

34. A method as in claim 33 wherein said morphological analysis includes opening said image and identifying, sizing and counting areas of white pixels.

35. A method as in claim 34 wherein said step of opening said image includes successively eroding and dilating the image using a 3×3 pixel structuring element.

36. A method as in claim 27 wherein said indicator further includes indicia marks regarding location of any dust found on said image.

37. A method as in claim 36 wherein said indicia includes the drawing of circles about dust locations.

38. A method as in claim 27 including the further step of applying a correction to subsequent pictorial images from said camera to automatically compensate for any detected dust spots from the images.

39. A method as in claim 27 further including the step of preventing the operation of said camera producing said test image if dust is indicated on said camera sensor.

40. A method for detecting the presence of sensor dust in digital cameras comprising steps of:
   (a) capturing a single test image of a selected predetermined calibration target said test image having a generally uniform pixel intensity throughout;
   (b) optionally verifying that the test image is suitable for dust detecting analysis by verifying image capture and target identity and preparing the image for a dust analysis;
   (c) optionally applying a flat field correction to the test image;
   (d) checking for dust effects by creating a binary image and performing a morphological analysis on said binary image to find and consider clusters containing collections of connected pixels to locate and identify areas that exceed a threshold size and that are darker than a threshold intensity;
   (e) optionally activating an indicator that indicates that dust is present if a predetermined number of areas are identified that exceed said threshold size and are darker than said threshold intensity; and
   (f) optionally creating a dust correction protocol to eliminate the effects of dust detected on the camera sensor from prints made of future images captured by the camera.

41. A method as in claim 40 including the further step of applying a correction to subsequent pictorial images from said camera to automatically compensate for any detected dust spots from the images.

42. A method as in claim 41 wherein said correction is in the form of an image template.

43. A method for detecting the presence of sensor dust in digital cameras comprising the steps of:
  a. capturing a test image of a selected predetermined calibration target, said target having a generally uniform pixel intensity value throughout;
  b. optionally verifying that the test image is suitable for dust detecting analysis by verifying image capture and target identity and preparing the image for a dust analysis;
  c. optionally applying a flat field correction to the test image;
  d. checking clusters containing collections of connected pixels for dust effects to locate and identify any area exceeding a threshold size that is darker than a threshold intensity;
  e. optionally activating an indicator that indicates that dust is present if one or more areas is identified exceeding said threshold size that is darker than said threshold intensity; and
  f. optionally creating a dust correction protocol to eliminate the effects of dust detected on the camera sensor from prints made of images captured by the camera.

44. The method as in claim 40 including the further step of applying a correction to at least one pictorial image captured by said camera to automatically compensate for any detected dust areas from the images.

45. A method as in claim 43 including the further step of applying a correction in the form of a template to pictorial images captured by said camera.

46. A method as in claim 1 wherein said test image is captured out of focus.

47. A method as in claim 16 wherein said test image is captured out of focus.

48. A method as in claim 27 wherein said test image is captured out of focus.

* * * * *